Nov. 1, 1960  R. T. MOORE  2,958,743
SHIELDED COLLECTOR SHOE AND BUS BAR
Filed June 20, 1957  3 Sheets-Sheet 1
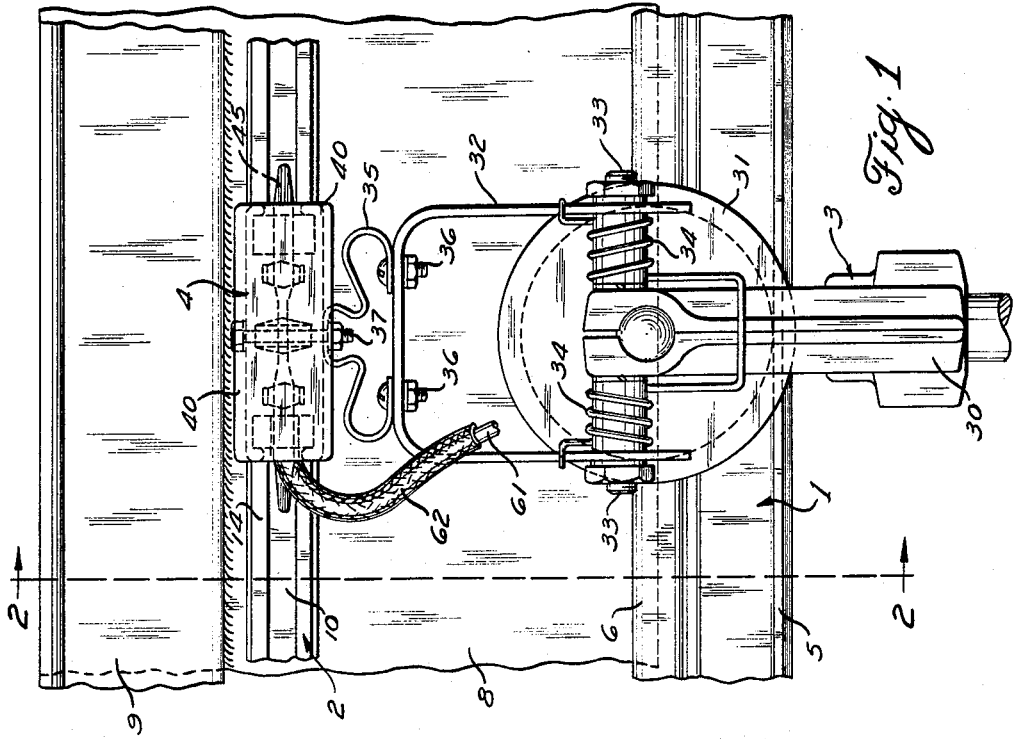
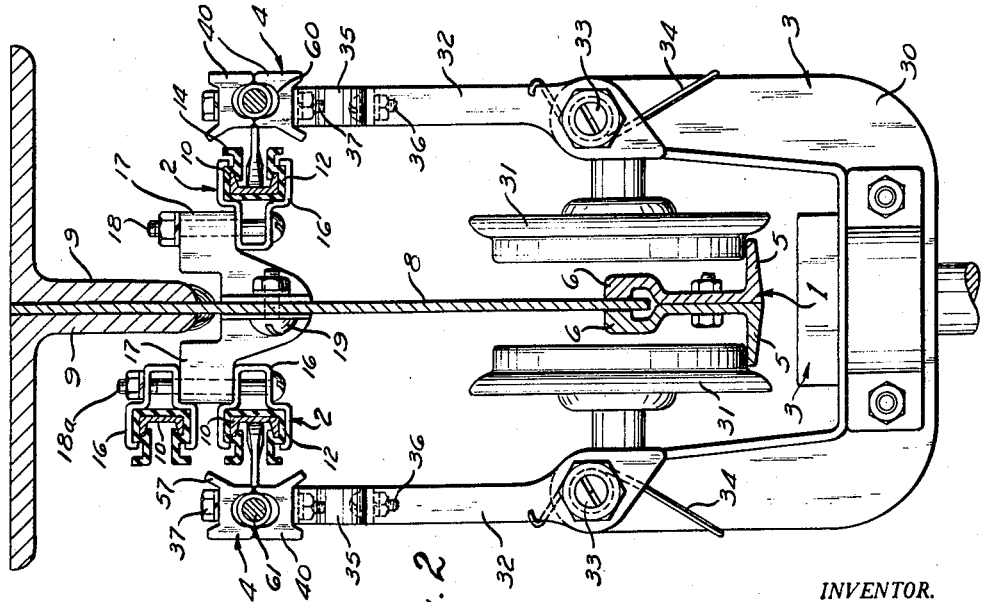
INVENTOR.
RALPH T. MOORE
BY
RICHEY, WATTS, EDGERTON,
McNENNY & FARRINGTON
ATTORNEYS Nov. 1, 1960 R. T. MOORE 2,958,743
SHIELDED COLLECTOR SHOE AND BUS BAR
Filed June 20, 1957 3 Sheets-Sheet 2
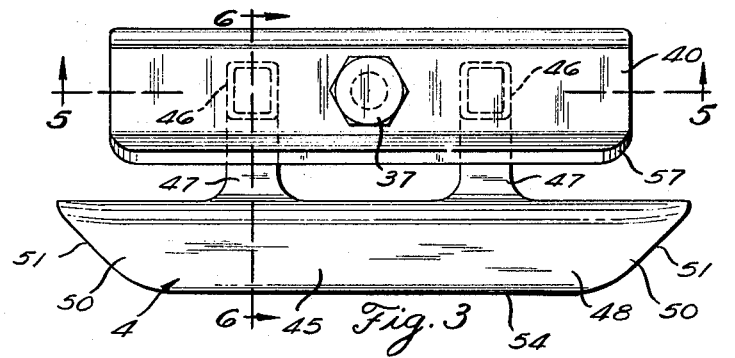
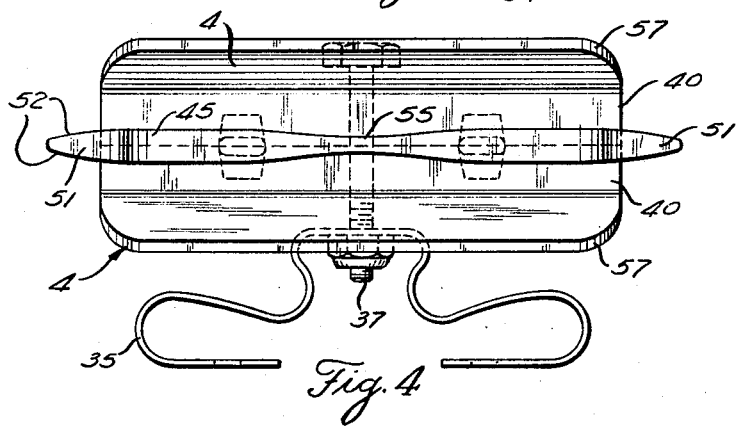
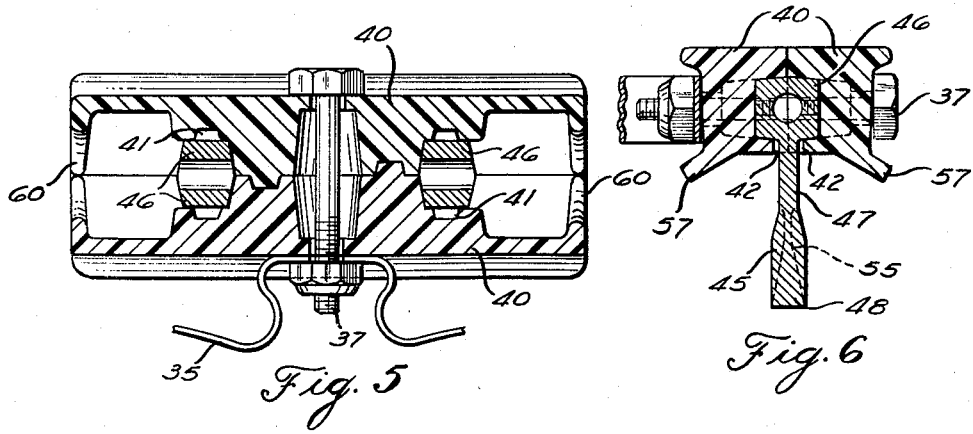
INVENTOR.
RALPH T. MOORE
BY
RICHEY, WATTS, EDGERTON,
McNENNY & FARRINGTON
D. D. Watts
ATTORNEYS Nov. 1, 1960  R. T. MOORE  2,958,743
SHIELDED COLLECTOR SHOE AND BUS BAR
Filed June 20, 1957  3 Sheets-Sheet 3
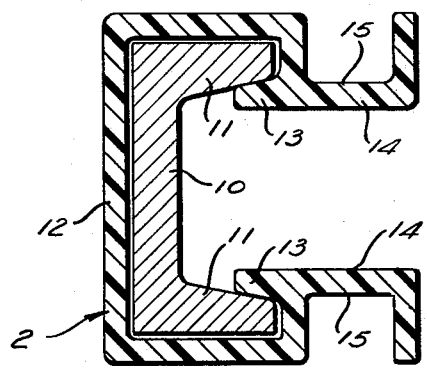
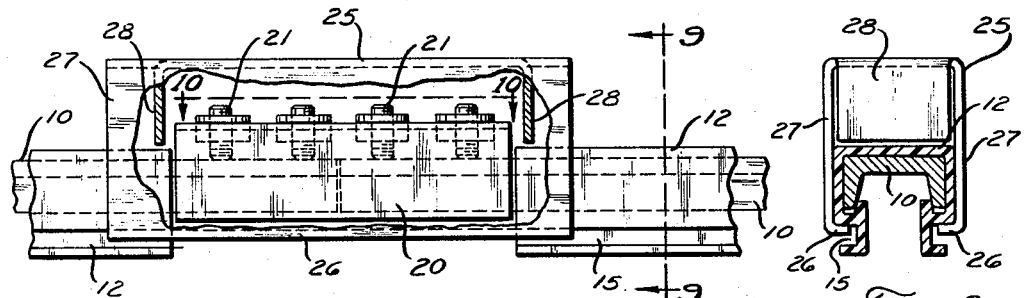
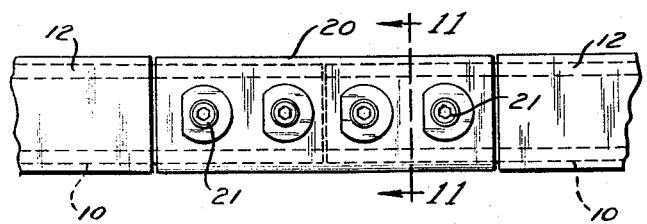
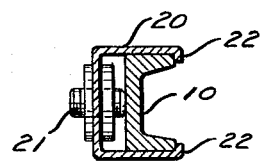
INVENTOR.
RALPH T. MOORE
BY
RICHEY, WATTS, EDGERTON,
MCNENNY & FARRINGTON
ATTORNEYS

United States Patent Office 2,958,743
Patented Nov. 1, 1960

2,958,743

SHIELDED COLLECTOR SHOE AND BUS BAR

Ralph T. Moore, Lakewood, Ohio, assignor to The American MonoRail Company, Cleveland, Ohio, a corporation of Ohio Filed June 20, 1957, Ser. No. 666,859

5 Claims. (Cl. 191—23)

This invention relates generally to electrically energized, suspended trolleys and particularly to a new system including new current collectors and new shielded bus bars.

Heretofore many workers in the art of suspended trolleys have attempted to solve the problem of providing means by which electrical current may, with safety to workmen, be conducted along a bus bar beside an overhead track and to a trolley on the track. Although many devices have been proposed as a solution of this problem, none has been entirely satisfactory, so far as I am informed and believe. In some cases the shielding of the bus bar was complicated and yet not wholly safe. In other cases the shielding interfered with the vertical movements of the collector shoe which were caused by variations in the trolley tracks, for example, at switches, crossovers, and the like.

The present invention aims to provide a system in which all danger of injury to workmen due to electrical current from the bus bar will be avoided and in which the collector shoe may move readily to adjust its vertical position relative to the bus bar to maintain substantially uniform contact therewith.

These aims are achieved by a new combination of elements, some of which are new, which accomplishes, in a new way, results which are new and are a result of the combination and are different from the results of the separate elements of the combination.

The present invention will be better understood by those skilled in the art from the following specification read in connection with the accompanying drawings in which:

Fig. 1 is a side elevational view of a system embodying the present invention;

Fig. 2 is a vertical, cross-sectional view taken on line 2—2 of Fig. 1;

Fig. 3 is a top plan view of the collector shoe assembly;

Fig. 4 is a side elevational view of the assembly of Fig. 3;

Figs. 5 and 6 are cross-sectional views taken on lines 5—5 and 6—6 respectively of Fig. 3;

Fig. 7 is an enlarged cross-sectional view of the bus bar and its insulating sheath of Figs. 1 and 2;

Fig. 8 is a fragmentary top plan view partly in section showing a splice and a splice cover for bus bar ends;

Fig. 9 is a view taken on line 9—9 of Fig. 8;

Fig. 10 is a view taken on line 10—10 of Fig. 8 but omitting the splice cover; and Fig. 11 is a view taken on line 11—11 of Fig. 10.

In Figs. 1 and 2 the system embodying the present invention is shown as comprising a track 1, bus bar assemblies 2, a trolley assembly 3 and a collector assembly 4.

The track 1 comprises oppositely extending flanges 5 of one or more rail parts 6, in this case two parts, which may constitute the lower edge of a rail. In this case the rail is fabricated by attaching two rail parts 6 to a web 8 and attaching top angles 9 to the upper edge of the web. It will be understood that the particular formation and construction of the track is not critical and that various constructions may be used so long as tracks for the trolley wheels are provided at the lower edge thereof.

One or more bus bar assemblies may be used with each track. In the drawings, three such assemblies are shown. Each assembly includes a bus bar, a sheath, a clamp and a bracket. The bus bar 10 is channel-shaped and is provided with flanges 11 extending laterally in the same direction (see Fig. 7). An insulating sheath 12 encloses the bus bar on three sides, has inturned locating ribs 13 which project inwardly along the opposed surfaces of the flanges 11 and outturned lips 14 provided with grooves 15 to receive clamps. This sheath may be made of any suitable material, for example, a plastic such as polyvinyl chloride. The sheath should not only be hard, stiff and shape-maintaining but sufficiently springy or flexible for the lips to "give" when the collector shoe and bus bar are shifted relatively in a vertical direction and thus not prevent or materially impede such movement.

The clamps 16, as shown, consist of flat, U-shaped pieces of spring metal having inturned ends to extend into grooves 15 and other inturned parts to engage the rear side of sheath 12. The mid-portion of clamp 16 has a parallel portion to bear against bracket 17. A bolt 18 which extends through bracket 17 and through one clamp 16 serves to connect the bus bar and its sheath to bracket 17, and a similar but longer bolt 18a may secure two clamps 16 to one bracket, as shown at the left side of Fig. 2. As is shown in Fig. 2, one bracket 17 supports one bus bar assembly while the other bracket supports two bus bars. The brackets 17 may be secured to rail 1 by any suitable means, for example, by bolts 19. It will be understood that when less than three bus bars are to be used, the requisite number may be omitted from Fig. 2, or if more than three bus bars are to be used, the requisite number may be added to the rail as, for example, by adding one or more bus bar assemblies and brackets.

The bus bars 10 may be spliced together in endwise relation as by means of splice 20. This splice is a generally U-shaped member composed of electrical conducting material such as copper, steel, or the like. The sheath 12 is stopped short of the end of each bus bar a distance such that when the two bared ends of the bus bars are brought into end to end contact, the splice 20 will extend from the end of one insulating sheath to the end of the other insulating sheath. The splice 20 is secured to the bus bars by means of set screws 21 which project therethrough and bear against the back surface of the bus bar 10, thereby forcing the bar forwardly against the inturned edges 22 of the splice. A splice cover 25 is employed to cover the splice 20 and prevent contact therewith by a workman or a tool in the hands of a workman. This splice cover is quite like sheath 12 in that it is generally U-shaped, has inturned ends 26 to engage in grooves 15 in sheath 12, has parallel portions 27 extending along the upper lower sides of the sheath, an enlarged space to receive the set screws 21 and the splice 20 and has enclosed ends 28 to engage the rear side of the sheath at each end of splice 20.

It will be noted that sheath 12 closely engages the rear, top and bottom sides of bus bar 10 and that the inturned ribs 13 bear snugly against the inner opposed surfaces of flanges 11 of the bus bar. By this arrangement the bus bar is firmly held in position in the sheath and movement of these two parts relative to one another is prevented. The ribs 13 also serve the further purpose of protecting the outer edges of the flanges 11 of the bus bar from contact with any electrical conductor which may be in the hands of a workman. The outturned lips 14 of the sheath serve the dual purpose of preventing the insertion of a current conductor in the hands of a workman into the sheath far enough to make electrical contact with bus bar 10 and of covering the portion of the current collector which projects from its support, as will presently appear.

The trolley assembly comprises yoke 30 which is provided with wheels 31 positioned to rest on the top surface of flanges 5 of the rail and to run therealong and includes arms 32 which are pivotally connected to each of the upright parts of the yoke by pivots 33. Springs 34 serve to press arms 32 toward the bus bar assembly which is carried by the track. While Fig. 2 shows spring 34 arranged to press the bus bar assemblies toward the track, it will be understood that a mere reversal of spring 34 on pivot 33 will serve to press the arms 32 toward bus bars which are carried on the outer sides of arms 32 instead of on the inner sides as shown in Fig. 2.

A flat, reversely bent spring 35 is secured to the upper part of each arm 32, as by bolts 36 and each spring is connected by a bolt 37 to a collector assembly.

Each collector assembly (see Figs. 3–6) includes two similarly shaped insulator blocks 40 each provided with recesses 41 and notches 42 and a collector shoe 45. This shoe is made of a single piece of electrically conducting material such as aluminum, bronze, or the like, and includes lugs 46 positioned to seat in recesses 41 of the two insulator blocks 40, legs 47 to fit in notches 42 of the insulator blocks and a shoe 48 of a size and shape suitable to project between outturned lips 14 of sheath 12 and engage the surface of bus bar 10 between flanges 11. The shoe has end portions 50 which are provided with outwardly tapering surfaces 51 and converging side surfaces 52 while the body portion of the shoe has a substantially straight bus bar engaging surface 54 which is narrowed between legs 47, as noted at 55. Since the shoe 45 and legs 47 are smaller in vertical dimensions than the space between outturned lips 14 of the sheath, the shoe may change its vertical position relative to the bus bar 10 without being impeded by the sheath or without breaking contact with the bus bar. The converging surfaces 52 at the ends of the shoe 48 permit the shoe to move freely across a splice where the bus bars may not be accurately arranged horizontally, or to pass from one bus bar to another bar separate therefrom and not in exactly the same horizontal plane, all without interfering with the free movement of the collector along the bus bar. The spring 35 permits tilting of the shoe so that one end may move to a position above the other, and this tilting action together with the converging surfaces 52 and the thin portion 55 of the shoe cooperate to bring about free movement of the shoe over misaligned ends of the bus bars.

It will be noted that each of the insulator blocks 40 is provided with inclined edges 57 and that when the two blocks are assembled with the collector shoe and the shoe is assembled with the sheath and bus bar, these edges 57 will engage the outer edge of the outturned lips 14 and thus those edges and lips will effectively cover the legs of the collector between the blocks 40 and the lips 14.

The blocks 40 also have end openings 60 through which may extend a current conducting cable 61 connected to one of the lugs 46 of the collector shoe and leading to a motor (not shown). This cable is covered with the usual insulation 62.

From the foregoing description it will be understood that the present invention provides a system in which a collector assembly is carried by a trolley and includes a shoe and a bus bar assembly in which the bus bar is enclosed in an insulating sheath having springy or flexible lips between which the shoe of the collector assembly may project while being insulated against contact with a conducting tool in the hands of a workman.

Having thus described this invention in such full, clear, concise and exact terms as to enable any person skilled in the art to which it pertains to make and use the same, and having set forth the best mode contemplated of carrying out this invention, I state that the subject-matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. An electrical system comprising a substantially horizontal rail having laterally extending flanges to support trolley wheels, means for supporting said rail, a trolley below said rail and having supporting wheels to run on said rail flanges, at least one bus bar connected to the rail and positioned substantially parallel to and above the adjacent flange thereof, an insulating shield enclosing and closely engaging the bus bar on all but one side and having spaced apart, substantially horizontal lips projecting therebeyond on said one side remote from the rail to admit a current collector shoe therebetween, said lips being hard, stiff, shape-maintaining and sufficiently springy to be deflected when engaged by such a shoe, an arm pivotally carried by said trolley, a spring connected to and extending up from the arm and having a vertically movable part, a collector assembly connected to said vertically movable part of said spring and including a shoe positioned to project through the space between the lips of said shield and to engage with said bus bar, and a spring engaging said arm and urging said shoe laterally into engagement with the bus bar.

2. An electrical system comprising a substantially horizontal rail having laterally extending flanges to support trolley wheels, means for supporting said rail, a trolley below said rail and having supporting wheels to run on said rail flanges, at least one bus bar connected to the rail and positioned substantially parallel to and above the adjacent flange thereof, an insulating shield enclosing and closely engaging the bus bar on all but the side remote from the rail and having spaced apart, substantially horizontal lips projecting therebeyond on said one side to admit a current collector shoe therebetween, said lips being hard, stiff, shape-maintaining and sufficiently springy to be deflected when engaged by such a shoe, an arm pivotally carried by said trolley, a spring connected to and extending up from the arm and having a vertically movable part, a collector assembly connected to said vertically movable part of said spring, said assembly including two insulating blocks and a shoe carried between said blocks and projecting therefrom to extend laterally through the space between the lips of said shield and to engage with said bus bar, and a spring engaging said arm and trolley and urging said shoe laterally into engagement with the bus bar.

3. An electrical system comprising a substantially horizontal rail having laterally extending flanges to support trolley wheels, means for supporting said rail, a trolley below said rail and having supporting wheels to run on said rail flanges, at least one bus bar connected to the rail and positioned substantially parallel to and above the adjacent flange thereof, an insulating shield enclosing and closely engaging the bus bar on the side remote from the rail and having spaced apart, substantially horizontal lips projecting therebeyond on said one side to admit a current collector shoe therebetween, said lips being hard, stiff, shape-maintaining and sufficiently springy to be deflected when engaged by said shoe, an arm pivotally carried by said trolley, a spring connected to and extending up from the arm and having a vertically movable part, a collector assembly connected to said vertically movable part of said spring, said assembly including two insulator blocks having opposed recesses and notches, a collector having lugs in certain of said recesses, legs projecting from the lugs through certain of said notches, and a shoe connected to the legs and projecting horizontally between the lips of said shield and engageable with said bus bar and a spring engaging said arm and trolley and urging said shoe laterally into engagement with the bus bar.

4. An electrical system comprising a substantially horizontal rail having laterally extending flanges to support trolley wheels, a channel-shaped bus bar connected to the rail and positioned substantially parallel to and above the adjacent flange thereof and having parallel spaced apart flanges provided with free edges, and an insulating shield engaging the outer surfaces of the bus bar and having ribs engaging the free edges and the inner opposed surfaces of the flanges, said shield having spaced apart lips projecting beyond the flanges to admit the entry of a current collector shoe therebetween and into engagement with the bus bar between said ribs, said lips being hard, stiff, shape-maintaining and sufficiently springy to be deflected when engaged by such a shoe, said shield and bar being held in assembled position by the snug engagement of the shield and its ribs with the bus bar.

5. An electrical conductor device for use with an overhead trolley rail comprising a channel-shaped bus bar having parallel spaced apart flanges provided with free edges, and an insulating shield engaging the outer surfaces of the bus bar and having ribs engaging the free edges and the inner opposed surfaces of the flanges, said shield having spaced apart lips projecting beyond the flanges to admit the entry of a current collector shoe therebetween and into engagement with the bus bar between said ribs, said lips being hard, stiff, shape-maintaining and sufficiently springy to be deflected when engaged by such a shoe, said shield and bar being held in assembled position by the snug engagement of the shield and its ribs with the bus bar.

References Cited in the file of this patent

UNITED STATES PATENTS

| | | |
|---|---|---|
| 810,069 | Miller | Jan. 16, 1906 |
| 1,611,733 | Freeman | Dec. 21, 1926 |
| 1,747,924 | Baumgarten | Feb. 18, 1930 |
| 2,443,371 | Barner | June 15, 1948 |
| 2,443,387 | Harris | June 15, 1948 |
| 2,537,866 | Tanner | Jan. 9, 1951 |
| 2,640,114 | Wehr | May 26, 1953 |
| 2,700,705 | Anjeskey et al. | Jan. 25, 1955 |